United States Patent Office 3,115,493
Patented Dec. 24, 1963

---

3,115,493
DICHLOROCYANURATE COMPLEX
Ronald W. Marek, Tonawanda, N.Y., assignor to Olin Mathieson Chemical Corporation, New Haven, Conn., a corporation of Virginia
No Drawing. Filed June 26, 1961, Ser. No. 119,310
1 Claim. (Cl. 260—242)

This invention relates to the preparation of a novel chlorine containing composition. The composition contains available chlorine, and it is especially useful in bleaching applications and in applications where disinfecting properties are required.

The unique product of this invention can be readily prepared by the reaction of the lead salt of dichlorocyanuric acid with a copper salt. The compound is surprisingly stable and retains its available chlorine for a much longer period than the commercially available dichlorocyanuric acid or simple salts thereof.

The structure of this novel chlorine containing composition is believed to be of the form:

$$PbCu(Z)_4$$

wherein Z is the dichlorocyanurate radical consisting of the group $(C_3N_3O_3Cl_2)^-$ or structurally

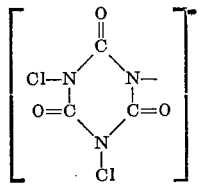

The reaction of the lead dichlorocyanurate with the cupric salt is preferably performed in water or acetone since the product readily precipitates from these solvents. In any event, solvents must be employed which are not susceptible to chlorination or oxidation. Reaction is preferably carried out at a pH of about 5.5 although a pH range of 4 to 7 may be utilized. Care must be taken to prevent reaction from proceeding in basic medium in view of the insolubility of cupric oxide and hydroxide in basic medium.

The desired reaction proceeds well at room temperature although higher temperatures have been used. There are no critical reactant concentrations, but obviously sufficient reactants must be present in the reaction medium to ensure that the product precipitates from solution.

The reactant ratios are not critical since the product will form until the reactant present in lesser stoichiometric amount is consumed. However best results have been obtained when about 0.5 to 20 equivalent weights of the lead dichlorocyanurate are reacted with an equivalent of cupric salt.

Formation of the precipitate proceeds rapidly when the reactants are mixed together, but a brief stirring period ensures that reaction is complete before filtration of the product is completed. The following examples will serve to illustrate the steps involved in the preparation of this unique chlorine containing composition.

Example 1

A solution of lead acetate was prepared by dissolving 0.25 mole of the salt in 500 cc. of water. This solution was added at room temperature with stirring to a solution of one mole of potassium dichlorocyanurate in 1500 cc. of water. A white precipitate formed almost immediately upon mixing of the solutions. Precipitation of the lead dichlorocyanurate was completed by cooling in an ice bath.

The filtered and dried lead dichlorocyanurate contained 43.1% available chlorine and the yield was 79%.

Example 2

To a solution of 0.05 mole of lead dichlorocyanurate in 1200 cc. of water was added 0.025 mole of cupric chloride dihydrate. A precipitate formed over a fifteen minute period and after an additional stirring period, the precipitate was collected by filtration. After drying, 11.0 g. of a solid was obtained which closely approximated the color of Hortense V (A Dictionary of Color, Maerz and Rea Paul, McGraw-Hill and Co., Inc., 1950). The product analyses shown below agree with the product formula:

$$PbCu(C_3N_3O_3Cl_2)_4$$

|  | Theoretical, percent | Found, percent |
|---|---|---|
| Lead | 19.6 | 20.4 |
| Copper | 6.0 | 5.7 |
| Available chlorine | 53.6 | 51.0 |

In this composition, the molar ratio of Pb:Cu:Cl is 1:1:8.

The product obtained in Example 2 was soluble in water to the extent of 0.50 g. per 100 cc. of solution.

The thermal stability of the product was determined by slowly heating a small sample of the compound to a temperature of about 250° C., cooling and recording the available chlorine before and after the heat treatment. For comparative purposes, dichlorocyanuric acid and the sodium salt thereof were subjected to the same treatment.

| Compound | Thermal Stability | | | |
|---|---|---|---|---|
|  | Temp., °C. | Initial Av. Cl₂ | Final Av. Cl₂ | Percent Av. Cl₂ Lost |
| PbCu(Z)₄ | 250 | 51.0 | 49.1 | 3.9 |
| Sodium dichlorocyanurate | 250 | 60.0 | 27.7 | 53.8 |
| Dichlorocyanuric acid | 250 | 68.8 | 14.2 | 79.3 |

The above thermal stability test is a severe one, and it is noted that the novel product of this invention exhibits a much higher degree of stability than the reference compounds. This high degree of stability is of special value as it ensures a prolonged shelf life for the product without excessive deterioration of the compound through loss of available chlorine.

The novel composition of this invention has commercial utility as a bleaching agent, and this is so especially in those applications where an improved thermal stability is a prime requisite, e.g. laundry bleaches, bleaching agents in cleansers, tropical bleaches and war gas decontaminants.

Furthermore the unique combination of lead and copper in this composition is especially attractive. Surprisingly the fungicidal activity of the composition is not adversely effected by the presence of the combined lead which contributes toward inseticidal activity.

The ease of formation of this novel composition is noteworthy since no similar composition has yet been prepared by the reaction of lead dichlorocyanurate with a silver salt.

What is claimed is:

The compound of the formula $PbCu(C_3O_3N_3Cl_2)_4$ wherein the radical $(C_3O_3N_3Cl_2)^-$ is the dichlorocyanurate radical.

References Cited in the file of this patent
UNITED STATES PATENTS 2,913,460     Brown et al. _____ Nov. 17, 1959

FOREIGN PATENTS 219,930     Australia _____ Jan. 22, 1959

OTHER REFERENCES

Chem. Abstracts, vol. 8, pp. 930–1 (1914), abst. of Ley et al., Ber. 46, pp. 4040–50 (1913).

Beilstein's Handbuch der Organischen Chemie, 4th ed., vol. 26, System 3889, pp. 241–3, Verlag von Julius Springer, Berlin (1957).